United States Patent [19]

Mitchell

[11] 3,976,035
[45] Aug. 24, 1976

[54] ROTARY ENGINE AND METHOD OF OPERATION
[75] Inventor: Edward Mitchell, Hopewell Junction, N.Y.
[73] Assignee: Texaco Inc., New York, N.Y.
[22] Filed: Sept. 26, 1974
[21] Appl. No.: 509,373

[52] U.S. Cl. ............................................. 123/8.09
[51] Int. Cl.² ........................................ F02B 53/10
[58] Field of Search .................. 123/8.09, 8.11, 8.13

[56] References Cited
UNITED STATES PATENTS

| 3,682,151 | 8/1972 | Tatsutomi ..................... 123/8.01 X |
| 3,699,929 | 10/1972 | Bennethum ......................... 123/8.09 |
| 3,780,707 | 12/1973 | Cole .................................. 123/8.13 |
| 3,847,517 | 11/1974 | Hermes et al. ................. 123/8.09 X |

FOREIGN PATENTS OR APPLICATIONS

| 1,299,931 | 7/1969 | Germany ........................... 123/8.13 |
| 1,426,036 | 9/1969 | Germany ........................... 123/8.45 |
| 1,027,787 | 4/1966 | United Kingdom ................ 123/8.09 |

Primary Examiner—Carlton R. Croyle
Assistant Examiner—Michael Koczo, Jr.
Attorney, Agent, or Firm—T. H. Whaley; C. G. Ries; Robert B. Burns

[57] ABSTRACT

A rotary piston engine including a casing having a trochoidal inner surface which defines an elongated cavity therethrough. Opposed end walls close said cavity, and a rotary pistion is journalled therein to be driven in a planetary movement, thereby rotating a drive shaft. Apices formed intermediate peripheral piston faces, slidably contact the trochoidal surface during the engine intake, compression and combustion periods. Each of said piston faces is provided with a shaped compound depression comprised in part of a first cavity in which an air-fuel charge is formed, compressed, and ignited. The resulting flame passes into a second or main portion of the compound cavity to ignite the major portion of the charge and complete the combustion phase.

10 Claims, 6 Drawing Figures

ROTARY ENGINE AND METHOD OF OPERATION

BACKGROUND OF THE INVENTION

In the field of internal combustion engines the rotary, or Wankel type engine, as it is often referred to, embodies a number of advantages which make the engine a commercially desirable power plant. Primarily, the relatively simple construction of the engine gives it a significantly reduced bulk and weight for power output. Further, operationally the engine is inherently smooth running due to the unidirectional rotation of the piston. Such motion greatly reduces the degree of vibration and repetitive stress which would ordinarily be experienced in a reciprocating type engine.

However, among the disadvantages which must be tolerated concomitant with the use of the rotary engine, includes the relatively poor fuel economy realized when operated under ordinary circumstances. This penalty in fuel consumption which falls onto the automotive user is found along the entire operating range of the engine.

Further, in view of the desire to minimize the amount of air pollution associated with the operation of any internal combustion engine, the rotary engine is amenable to improvement. For example, under ordinary operating circumstances there will result an exhaust gas from the rotary engine, that is inherently high in HC and CO emissions. Both of these components are found to require relatively complicated control systems if the amount of such emissions is to be reduced to within reasonable ranges.

The rotary engine, as with most internal combustion engines, is limited in the character of the fuel it uses. The latter must be particularly chosen, and carbureted into the engine on an air stream in a manner to form a stoichiometric mixture capable of being easily ignited by a spark source.

Toward affording an improvement in rotary engines whereby the latter will overcome the above noted operational difficulties, and toward permitting use of a greater latitude in the type and grade of fuels which can be burned in the engine, the present invention is disclosed.

The latter includes as a primary objective, the provision of means whereby a number of fuels having minimal octane or cetane requirements can be utilized and efficiently burned in a rotary engine. It further provides means for minimizing the amount of atmospheric pollutants which result from the combustion event in the engine.

Toward meeting the above noted objectives, and providing an improved rotary engine, the instant invention relates to such an improvement wherein the engine includes a casing or housing provided with an internal cavity defined by a trochoidal surface. A rotary piston or rotor comprised of three peripheral faces, is sealably journalled for rotation within the cavity. Each peripheral face, although assuming a generally arcuate configuration, is provided with a shaped compound cavity or depressed pocket.

In one embodiment, a charge fed into the engine during the intake period, compresses air or a suitable mixture of air and other combustibles such as recycled exhaust gas. During the firing period a stream of fuel is forcibly injected into the first of the compound piston cavities. The combustible mixture in the latter, being relatively rich, is immediately ignited in the cavity. The resulting flame, under expanding pressure, is propagated into the second or expansion cavity whereby to ignite the relatively lean charge remaining there.

DESCRIPTION OF THE DRAWINGS

Referring to the drawings, FIG. 1 illustrates in cross section a rotary combustion engine 10 of the type contemplated including an outer housing or casing 11 having an elongated internal cavity 12 defined by a trochoidal surface. It is appreciated that the instant cross sectional view illustrates but a single unit of the rotary engine which can in its entirety be made up of a series of said units. In such a construction, each unit is adjacently connected and separated to accommodate a common drive shaft 13.

Figure 1:
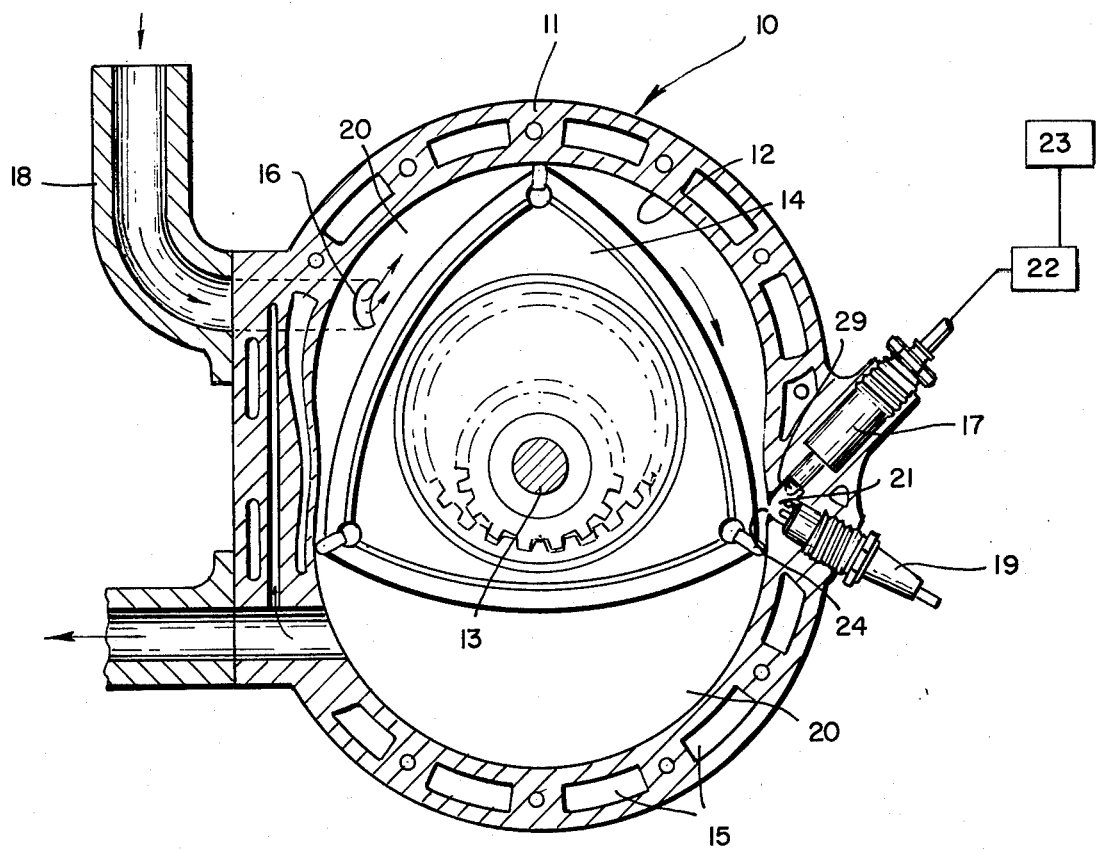
FIG. 1 is a cross sectional view of a rotary engine of the type contemplated.

A three sided rotor or rotary piston 14 is positioned within cavity 12 and journalled to power shaft 13 for rotation in a planetary motion. Normally, each of the casing 11 units are separated by an interwall such that the respective rotor sections are provided with end seals to assume a dynamic sealing about the engine combustion chamber as rotor 14 is driven.

Casing 11 is provided with a number of wall channels 15 for circulation of a cooling fluid. While not presently shown, such cooling is achieved usually with the aid of a pumping system including heat exchange means through which the coolant is carried.

Air is normally aspirated into the engine combustion chamber by way of an air inlet 16. Fuel can be carbureted and delivered to the combustion chamber on an air stream, but as presently shown is forcibly injected by a fuel injector 17.

The inlet means 16 as shown in FIG. 1, includes an air inlet manifold 18 through which air is aspirated when rotor 14 uncovers port 16, to permit introduction of a stream of air into combustion chamber 20. Also, as herein noted, while air is the preferable combustion supporting medium, the latter can be modified through the addition of an amount of exhaust gas and/or other media which might improve combustion characteristics.

The firing or power phase in the engine cycle is initiated by a spark plug 19 or similar means. The plug is removably positioned in a wall of casing 11, in a manner that its tip terminates in a recess 21. The latter is formed within the casing 11 immediately adjacent to the trochoidal surface, having a minimal opening 24 to avoid excessive bypassing as the rotor seal passes. Spark plug 19 is connected electrically to an ignition system suitable for providing the necessary timed spark to ignite the air-fuel charge during the compression period of the engine cycle.

Figure 2:
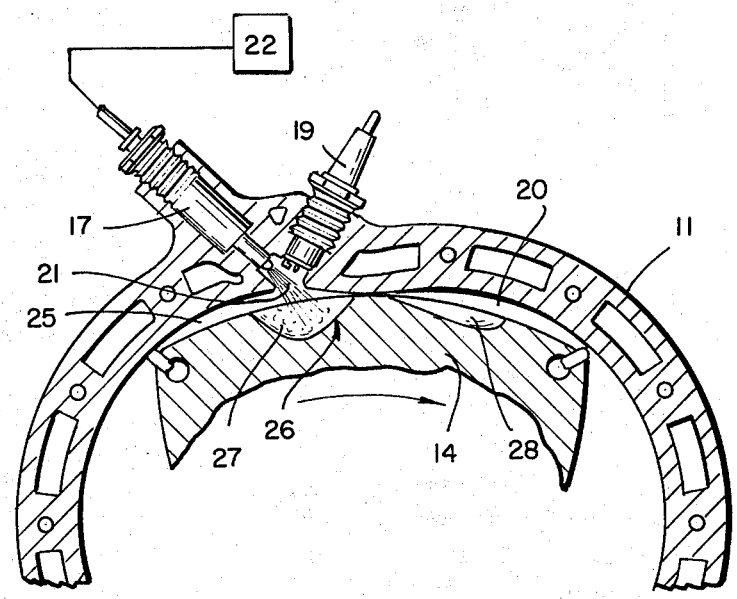
FIG. 2 is a segmentary view of a portion of FIG. 1.
Figure 3:
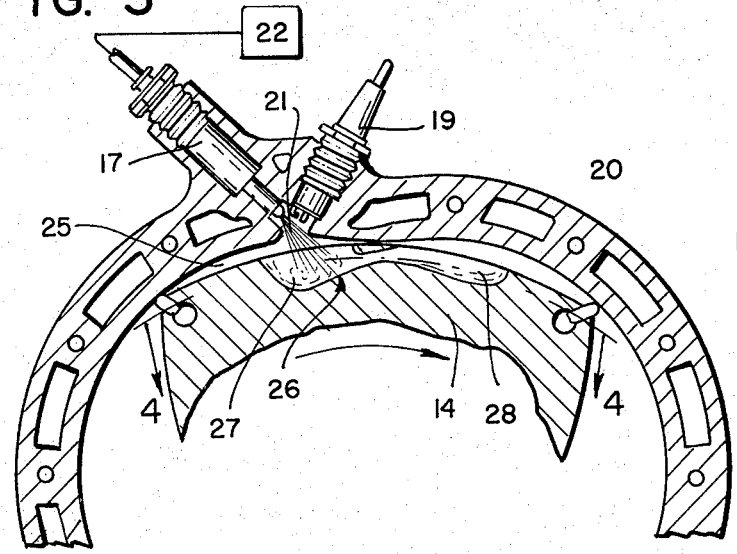
FIG. 3 is similar to FIG. 2.

At this point during the engine operating period, and as shown in FIGS. 2 and 3, the rotor face 30 into which cavities 27 and 28 are formed, will be positioned centrally of, and contiguous with the narrowed waist of the trochoidal cavity. In effect, the position of rotor 14 with respect to casing 11, positions the entire combustion chamber into two distinct combustion chamber segments. Further in such position, connecting channels 31 and 31' provide virtually the sole means of communication between said segments.

The engine's fuel injection system comprises fuel injector or nozzle 17 received through a wall of casing 11 and connected to a fuel pump 22. The latter is in turn communicated with a source of fuel 23 and functions through a timing mechanism. Thus, a predetermined amount of fuel is injected into the engine combustion chamber 20 in proper sequence, and in response to the load imposed on the engine.

As shown, injector nozzle 17 opens into cavity 21 common with, or immediately adjacent to the spark plug 19 tip. An entering fuel steam can thus be ignited immediately upon entry into the combustion compartment as it contacts air to form a rich, spark ignitable mixture.

Figure 4:
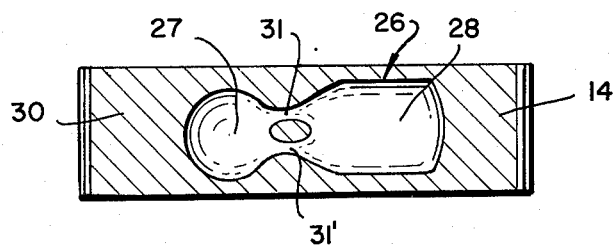
FIG. 4 is a cross sectional view taken along line 4—4 of FIG. 3.

Referring to FIG. 4, compound cavity 26 formed in each peripheral face 30 of rotor 14, comprises a plurality of relatively shallow depressions machined or cast into a rotor face and extending longitudinally thereof. Preferably, the compound cavity 26 includes first and second adjacently positioned depressions 27 and 28 respectively, disposed concentrically along the longitudinal axis of the rotor face. Each of said cavities 27 and 28 is smooth surfaced and contoured to facilitate and promote the rapid flow of air and subsequently an advancing flame front.

The first or precavity 27 is positioned in substantial alignment with fuel injection nozzle outlet 29. Thus, a pressurized stream of fuel will be periodically injected into the engine combustion chamber 20, and more directly into precavity 27. Said injection as herein noted will constitute a concentrated stream or patch of fuel droplets within the compressed air filled space defined by cavity 27 and the adjacent wall of casing 11. The resulting rich mixture is immediately spark ignited upon entry to initiate a flame front which expands through cavity 27 and through the combustion chamber segment 25. The flame front will then, under the pressure of expanding gas, propagate through prechamber 27 toward the constricted connecting channels 31 and 31'.

In the instance where fuel is injected only into cavity 27, the actual injection will be deferred until the latter part of the compression cycle. However, an alternate mode of operation could provide a lean fuel-air mixture which is carbureted into the compression chamber during the intake portion of the cycle. Here the mixture, even subsequent to compression, will be so lean as to be incapable of spark ignition.

The flame will advance through the respective substantially parallel channels 31 and 31' into the second or main cavity 28 in which a lean, or fuel free atmosphere is present. While such a lean mixture as is formed in main cavity 28 would be incapable of ignition by the normal sparking event, nonetheless it is readily ignited by the progressing flame.

The combustion event as it spreads through cavity 28, will cause a more thorough and orderly burning of the fuel mixture in said cavity as well as in adjacent combustion chamber 20. Such action will thereby assure a more complete combustion and as a result, a minimization of the pollutants which normally occur where less than complete combustion is experienced.

Toward facilitating the efficient combustion of the overall fuel-air charge, the fuel injection period is precisely timed with respect to the positioning of rotor 14 and the sparking event. Thus, immediately prior to the ignition point shown in FIGS. 2 and 3, first cavity 27 will substantially enclose a rich mixture while second cavity 28 will contain only air or a lean fuel-air mixture.

Where only air is aspirated through port 16 during the engine intake period, a minimal or minor flow of fuel to the combustion chamber can be commenced early in the compression period. Thereafter, at approximately the mid cycle point, a maximum or increased fuel flow is directed only into cavity 27 to form the desired rich mixture. This provision of the lean and rich air-fuel charges can be provided by a single injector 17 adapted to adjust its flow, or by multiple injectors.

Similarly, to normal rotary engine operations, the forward apex of rotor 14 toward the end of the combustion and expansion event, uncovers the discharge port 32. Exhaust gases will thereby be released to be further treated, recycled, or passed to the atmosphere. Thereafter, as the forward apex again traverses air inlet 16, the rear apex will traverse discharge port 32 to again permit entry of a new charge of air or fuel mixture into the combustion chamber 20.

Figure 5:
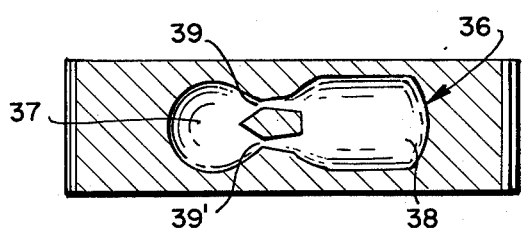
FIGS. 5 and 6 represent alternate embodiments of the arrangement shown in FIG. 4.
Figure 6:
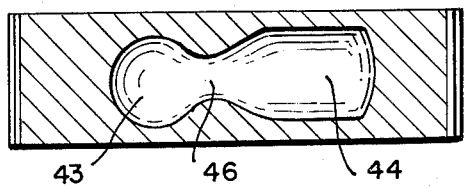

Referring to FIGS. 5 and 6, the compound cavity in the rotor faces can assume a number of variations while providing the necessary function. For example, FIG. 5 illustrates compound cavity 36 consisting of cavities 37 and 38. The latter are communicated by a plurality of divergently arranged channels 39 and 39'. The latter are constricted but arranged to open into cavity 38 by way of diverging openings thereby to spread the propagating flame. The intermediate guide wall 41 of the channels can be provided with a convergent entrance wall to better funnel the flame as it leaves cavity 37.

In the instance of FIG. 6, cavities 43 and 44 are communicated by way of a single, constricted slot 46. Said slot, although not clearly shown, embodies a smooth surface along which the flame is squeezed down to a minimal size.

The preferred mode of operation of the engine necessitates only regulation of the fuel flow by way of fuel pump 22. However, to improve operating conditions under some circumstances, throttling at intake 18 manifold can be provided for either air, or a premixed fuel-air charge.

In any event, the engine will produce a considerably lesser volume of pollutant gas than is ordinarily experienced. For example, ignition and burning of the initial rich charge will reduce the amount of $NO_x$ which is produced. Further, the subsequent flame ignition of the lean charge in cavity 28 will tend to reduce the amount of HC and CO produced to a more acceptable level.

From an overall consideration the engine as described will offer both clean, efficient and low pollutant operations. By virtue of the lean fuel-air mixture, it will also assure an economically desirable operation.

Other modifications and variations of the invention as herinbefore set forth may be made without departing from the spirit and scope thereof, and therefore, only such limitations should be imposed as are indicated in the appended claims.

I claim:

1. In a rotary piston engine including a casing having a chamber defined by trochoidal inner surfaces, with closure walls at opposite ends thereof, a rotary piston having peripheral faces bordered by spaced apart apices and being journalled to permit a planetary motion thereto whereby said apices slidably engage said trochoidal surface during the sequential injection, compression and combustion of a chargein the engine combustion chamber, a depressed segment of said rotor peripheral face having a compound combustion chamber formed therein including first and second longitudinally spaced apart cavities, inlet means in said casing positioned to introduce an air charge into said compound combustion chamber during the engine intake period, a fuel nozzle carried in said casing and positioned to introduce a stream of fuel toward said first cavity to form an enriched air-fuel mixture therein, spark means positioned in said casing to spark ignite the combustible portion of said enriched fuel mixture whereby to form a flame front, and at least one constricted means formed into said peripheral face intermediate the respective first and second cavities for directing discrete flames from said flame front into the second cavity for flame igniting the lean fuel charge established therein, said at least one constricted means including a plurality of substantially parallel constricted channels communicating the respective first and second cavities to guide said discrete flames from said flame front into the latter.

2. In an apparatus as defined in claim 1, wherein said compound combustion chamber includes a plurality of channels communicating said respective first and second cavities, being disposed in a flared arrangement to disperse the discrete flame from said flame front as the flames enter said second cavity.

3. In an apparatus as defined in claim 1, wherein said compound cavity extends substantially the length of a peripheral face of said rotor, being spaced from the respective rotor apices.

4. Method for operating a rotary type internal combustion engine having a casing defined by a trochoidal cavity therein, and a rotor journalled for rotation within said cavity, said rotor including longitudinally arranged first and second combustion cavities interconnected by a constricted channel means, which method includes the steps of;

compressing a combustion supporting medium into said engine combustion chamber to occupy said first and second cavities, injecting a predetermined amount of fuel into said combustion chamber to form a rich combustible mixture comprised of said fuel, and said combustion supporting medium within said first combustion cavity, and a lean mixture in the second cavity, spark igniting said rich combustible mixture whereby the latter will rapidly burn and create a flame front which expands toward said constricted channel means, forming said expanding flame front into discrete flame segments as said flame front passes through said constricted channel means whereby said discrete flame segments will enter said second cavity along one end of the latter to ignite said lean mixture therein.

5. In the method as defined in claim 4, wherein said flame front is divided into two adjacent flame segments.

6. In the method as defined in claim 4, wherein said flame front is formed into at least two adjacent flame segments which are directed into a divergent pattern to enter said second cavity along a relatively broad front.

7. In the method as defined in claim 4, wherein said combustion supporting medium includes primarily air.

8. In the method as defined in claim 4, wherein said combustion supporting medium includes a premixed stream of air and fuel forming a lean combustible mixture within said second combustion chamber.

9. In the method as defined in claim 4, including the step of initially introducing a minor flow of fuel into said combustion chamber to form a lean air-fuel mixture therein and thereafter directing a major flow of said fuel into said first cavity to form said rich combustible mixture.

10. In the method as defined in claim 4, wherein said combustion supporting medium includes a portion of exhaust gas intermixed therewith.

* * * * *